United States Patent
Knudsen et al.

[15] 3,671,858
[45] June 20, 1972

[54] METHOD AND APPARATUS FOR MEASURING THE THICKNESS OF LAYERS OF FAT AND FLESH IN CARCASSES UTILIZING THE DIFFERENCE IN ELECTRICAL CONDUCTIVITY BETWEEN LAYERS

[72] Inventors: Erik Stenberg Knudsen, Roskilde; Svend Erik Iversen, Ballerup; Svend Aage Lund, Birkerod; Allan Northeved, Barsvaeerd, all of Denmark

[73] Assignee: Slagteriernes Forsknungsinstitut, Roskilde, Denmark

[22] Filed: Feb. 17, 1971

[21] Appl. No.: 115,963

[30] Foreign Application Priority Data

Feb. 20, 1970 Denmark ..........................853

[52] U.S. Cl............................................324/65
[51] Int. Cl..........................................G01r 27/02
[58] Field of Search ..............324/65; 73/304 R; 340/244, 340/245, 246, 247

[56] References Cited

UNITED STATES PATENTS

| | | | |
|---|---|---|---|
| 2,763,935 | 9/1956 | Whaley et al. | 324/65 X |
| 2,987,672 | 6/1961 | Marsh et al. | 324/65 X |
| 3,552,209 | 1/1971 | Johnston | 73/304 |

*Primary Examiner*—Stanley T. Krawczewicz
*Attorney*—Kane, Dalsimer, Kane, Sullivan & Kurucz

[57] ABSTRACT

A method and an apparatus for measuring the thickness of layers of fat and flesh in carcasses utilizing the difference in electrical conductivity between said layers. A probe with three surface electrodes is introduced in to the carcass said electrodes being connected to an AC bridge for connecting adjacent current paths formed in the layers between said electrodes thereto. The probe is moved on, until an unbalanced condition of the bridge is observed by indicator means. The linear distance between measuring points associated with the carcass surface and the probe, respectively, being, then, measured in order to obtain the thickness of the fat layer. The probe may be moved right through the carcass in order to determine total thickness thereof by detecting flesh to air transition and retracted again for repeating the measurement made during insertion. Alternatively, a probe provided with a plurality of surface electrodes may be inserted in a stationary position in the carcass, said electrodes being then connected successively to the bridge by switching means and recordings being taken of the switching steps where the bridge enters from a balanced to an unbalanced condition.

24 Claims, 5 Drawing Figures

METHOD AND APPARATUS FOR MEASURING THE THICKNESS OF LAYERS OF FAT AND FLESH IN CARCASSES UTILIZING THE DIFFERENCE IN ELECTRICAL CONDUCTIVITY BETWEEN LAYERS

BACKGROUND OF THE INVENTION

The present invention relates to a method for determining the thickness of layers of fat and flesh in animal carcasses by means of electrical measuring between electrodes which are inserted, by means of a probe, into the carcass, wherein the difference in conductivity in fat and flesh, respectively, is utilized and the linear distance between a measuring point associated with the surface of the carcass and a measuring point on said probe is measured.

Methods for electrical measuring of the kind mentioned have been known for many years. However, these methods have appeared to be subject to such shortcomings that they did not gain ground in practice. Instead, another course has been followed, namely to construct devices by means of which it is possible to perform an optical viewing of the interface between fat and flesh.

SUMMARY OF THE INVENTION

The present invention is based on the recognition of the fact that the variation which is found to exist from carcass to carcass in the resistance of the layer of fat and the layer of flesh, respectively, can give rise to difficulties in the measuring process. It is possible, however, to overcome these difficulties by means of a suitable method and an appropriate device.

According to the invention, a method for measuring the thickness of layers of fat and flesh in carcasses is provided, comprising the steps of connecting at least three longitudinally spaced, insulated surface electrodes of a measuring probe to different junctions of an AC bridge circuit comprising a source of an AC measuring current and indicator means, adjusting said bridge circuit to a balanced condition, introducing said measuring probe in the carcass to be measured from the outer surface of said fat layer in order to incorporate by means of said three electrodes adjacent current paths extending transversely relative to said layers into two different branches of said bridge circuit, observing the condition of said bridge circuit by said indicator means during continued movement of said probe into said carcass, and measuring the penetration depth of one point of said probe at the moment when said bridge circuit enters from a balanced to an unbalanced condition.

By these measures, such a degree of accuracy is attained in the measuring results that it is possible to detect with certainty when the interface between fat and flesh is reached when introducing the probe into the object to be measured.

The use of an AC measuring current is found to be of substantial advantage over the DC current previously used, inter alia, because uncontrollable contact potentials are avoided. The employment of a bridge circuit makes it possible to measure differences in conductance between the fat and flesh layers, which prove to be approximately invariant quantities in contradistinction to the absolute resistance values of the layers which differ from carcass to carcass. Furthermore, it becomes possible to use quite low measuring currents. Whereas previously electrodes were used which were located on the sloping front face of a probe, it is suggested in the present invention to use electrodes situated on the surface of the cylindrical part of the probe, which has been found to be an advantage in practice.

In the method according to the invention, an AC measuring current of a relatively high frequency is preferably used, said frequency being, for example, of the order of magnitude of 40 kc/s.

In the method according to the invention, a measure is obtained of the linear distance between the surface of the carcass and the interface between the layers of fat and flesh.

In the method according to the invention, it is possible to move the probe right through the measuring object and to perform readings or records of measuring results both when introducing and retracting the probe. A storing and comparing of the results of the reading in the two cases can provide greater certainty in the thickness determination since the probability of coincidence of two erroneous indications, one during the introduction and one during the retraction, is low, and the divergence in readings taken at the actual measuring point is relatively small.

A method according to the invention opens up the possibility of an automation of this stage of the production process in a slaughter house, where manual processing is usually necessary due to the lack of uniformity in the material that is to be measured and the necessity of a person being present who is able to observe and record the measuring results.

According to the invention such an automatical method for measuring the thickness of layers of fat and flesh in carcasses comprises the steps of introducing at least one measuring probe provided with a plurality of longitudinally spaced, insulated surface electrodes into the carcass to be measured from one outer surface thereof, until extreme electrodes on said probe are located at or beyond opposite outer surface of said carcass, connecting by a stepwise electrical switching procedure said surface electrodes in successive groups of three adjacent electrodes to different junctions of a balanced AC bridge circuit comprising a source of an AC measuring current and indicator means in order to incorporate by means of each of said groups adjacent current paths extending transversely relative to said layers into two different branches of said bridge circuit, observing by said indicator means the condition of said bridge circuit during said switching procedure, and recording the steps of said switching procedure, at which said bridge circuit enters from a balanced into an unbalanced condition.

In such a method, it is possible by employing a number of separate probes to carry out measuring operations at a corresponding number of measuring points on the surface of the carcass simultaneously, so that the period of time for which the carcass has to remain at the measuring station, is reduced.

The invention relates moreover, to a measuring apparatus comprising a probe with measuring electrodes for use in determining the thickness of layers of fat and flesh. Such a measuring apparatus is known, for example, form U.S. Pat. No. 2,763,935.

In this prior art device, the measuring electrodes are fitted at the point of the probe.

According to the present invention, an apparatus is provided for measuring the thickness of layers of fat and flesh in carcasses, comprising an AC bridge circuit with a source of an AC measuring current, means connected to said bridge circuit for indicating balanced and unbalanced condition thereof, an elongated measuring probe with at least three insulated measuring electrodes arranged on the surface of a tubular part of said probe with a longitudinal spacing corresponding to the desired measuring accuracy, said electrodes being adapted for contacting said layers in contact points defining adjacent current paths extending transversely relative to said layers, conductor means extending inside said probe for connecting said electrodes to different junctions of said bridge circuit in order to incorporate said adjacent current paths into two different branches thereof and means for measuring the linear distance between a measuring point associated with the surface of the carcass and a measuring point on the probe, respectively.

The measuring electrodes may be constructed in different ways in dependence on the purpose of the measuring. In a preferred embodiment of the measuring device according to the invention, the measuring electrodes are annular.

In a measuring apparatus according to the invention the measuring probe may comprise a central core with a sharp-edged spear member in one end thereof and a tubular envelope arranged coaxially with said core, said conductor means extending in the spacing between said core and said envelope from said electrodes to the end of the probe remote from said spear member.

Furthermore, according to the invention an apparatus may be provided for measuring the thickness of layers of fat and flesh in carcasses comprising an AC bridge circuit with a source of an AC measuring current, means connected to said bridge circuit for indicating balanced and unbalanced condition thereof, an elongated measuring probe with a plurality of insulated measuring electrodes arranged on the surface of a tubular part thereof through a length corresponding to the maximum total thickness of a carcass to be measured, said electrodes being adapted for contacting said layers in contact points defining adjacent current paths extending transversely relative to said layers, conductor means extending inside said probe for connecting each of said electrodes to an electrode terminal, and a switching device arranged between said electrode terminals and said bridge circuit for connecting successively groups of electrode terminals associated with three adjacent electrodes to different junctions of said bridge circuit in order to incorporate the adjacent current paths defined by said three electrodes into two different branches of the bridge circuit.

In this apparatus it is, thus, possible to perform the measuring by successive selection of the electrodes and the basis for a fully automatic measuring method is created, in which the measuring objects, by way of example, pigs' carcasses, are automatically conveyed to a measuring station where they are maintained in a predetermined position, whereupon a number of measuring probes corresponding to the desired number of measuring points are automatically introduced, the electrodes of said probes being then successively connected to the bridge circuit for detecting and recording the thickness of the fat layer and, possibly, also that of the flesh layer, at each measuring point. After completed measuring, the probes are retracted and the measuring object is moved on so as to make room for a new measuring object at the measuring station.

BRIEF DESCRIPTION OF THE DRAWINGS

In the following, the invention is explained in greater detail with reference to the accompanying schematical drawings, in which.

DETAILED DESCRIPTION

Figure 1:
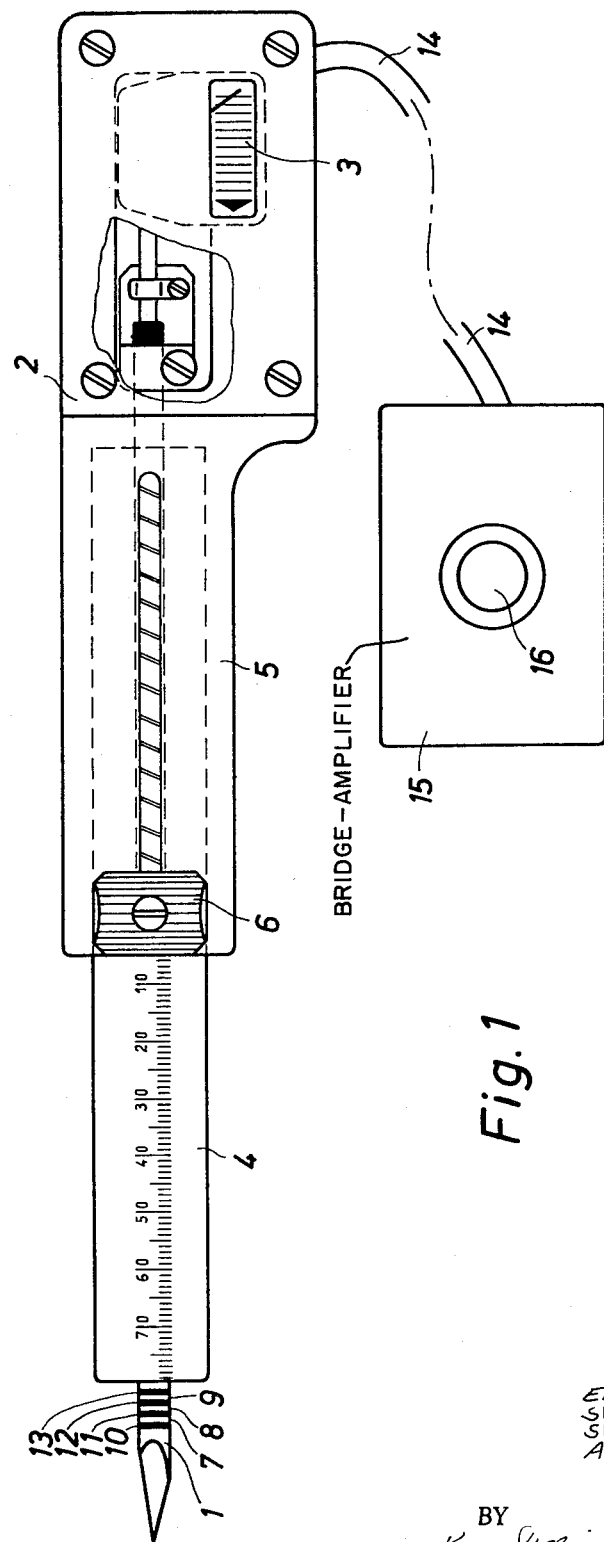
FIG. 1 shows an embodiment of a measuring apparatus according to the invention.

In FIG. 1, 1 designates a measuring probe provided with a sharp-edged spear member in one end and secured in the opposite end in a casing 2 incorporating indicator means in the form of a pointer instrument 3. Said indicator means may also consist of two or three control lamps having, preferably, different colors, e.g. red, yellow and green for indicating flesh, flesh-fat interface and fat, respectively.

The apparatus is provided with means for measuring the linear distance between a measuring point on the probe and a measuring point associated with the surface of the measuring object. In the example shown, a movable measuring device is provided in the form of a rule 4, which is telescopically slidable relative to a handle portion 5 which is secured to the housing of the pointer instrument 3. A finger rest or button 6 is rigidly connected to said rule and can be moved forwards and backwards in a slot in the handle portion 5.

Figure 4:
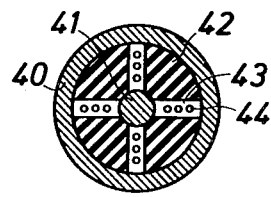
FIG. 4 is a cross-sectional view of an embodiment of a measuring probe for use in the method according to the invention.

In the embodiment shown, the probe 1 has three annular electrodes 7, 8 and 9, which are insulated relative to each other as well as to the probe by means of four insulating rings 10, 11, 12 and 13. In the constructional design of the probe, regard has to be taken to the fact that the rigidity of the probe should be sufficient for allowing the probe to be introduced into the measuring objects without any risk of damaging it under the operating conditions prevailing in practice. In FIG. 4, a cross-sectional view of a preferred embodiment of a probe for use in the measuring apparatus is shown.

In FIG. 4, 40 designates a narrow tubular envelope and 41 a cylindrical core, both made of stainless steel or some other suitable material. Between the core and the envelope, spacing members of sector-shaped cross-section are interposed, which may, for example, be of insulating material. In the example shown, there are four such spacing members, of which one is designated by 42. Between the spacing members, inside the probe, longitudinal ducts 43 are formed for accomodating conductor lines 44 to the electrodes 7, 8 and 9.

Alternatively, the probe may be constructed in another way. The electrodes and conductor lines may, for instance, be placed in milled recesses in the surface of a solid, rod-shaped probe, the recesses being first covered with a thin layer of insulating material, on to which electrically conductive material is applied, e.g. electrolytically or by means of sputtering, in order to form both electrodes and supply lines. The electrodes remain exposed, while the conductor lines are covered with insulating material.

In FIG. 1, the conductor lines inside the probe are, through a cable 14, connected to an electrical unit in the form of a separate casing 15 incorporating a bridge circuit, a battery, an oscillator for generating an AC measuring current and an amplifier for amplifying the signal from the bridge circuit, which is a measure of the difference in resistance between the two adjacent current paths formed between the electrodes 7, 8 and 8, 9, respectively. The signal from the output of the amplifier is returned through the cable 14 to the indicator 3 in the casing 2 of the measuring device, the operator being, thus, able to read the result from the part of the measuring apparatus which is in his field of vision when it is introduced into the measuring object.

Figure 2:
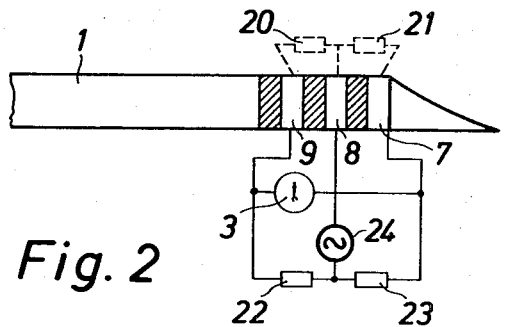
FIG. 2 shows a diagram to illustrate the employment of an AC bridge circuit in the method according to the invention.

When performing measuring operations, the operator first checks that the operational condition of the device is in order, which is done by means of a switch 16 on the unit 15, whereby the battery is connected to the indicator 3. Thereupon, the switch is put into its operational position, whereby the output of the amplifier is connected to the indicator 3. The probe is introduced into the measuring object. As long as the two current paths 7, 8 and 8, 9 are both extending in the fat layer, the resistance in the branches 20 and 21 of the bridge circuit, in which said current paths are connected, are relatively high, but uniform, vide FIG. 2, in which the other two branches of the bridge circuit are designated by 22 and 23, said branches containing fixed resistors. An AC current source or oscillator is designated by 24 and is connected in the one diagonal of the bridge circuit between the electrode 8 and the junction between the resistors 22 and 23. The indicator 3 is connected in the other diagonal of the bridge between the electrodes 7 and 9.

At the moment, at which the current path 7, 8 passes the interface between the layers of fat and flesh, the balance of the bridge circuit is disturbed, which is observed by means of the indicator 3. The penetration of the probe into the measuring object is interrupted and it is now possible to read the thickness of the layer of fat on the rule 4 by sliding one end thereof into abutment against the surface of the measuring object by pressing the button 6 with a finger.

The electrode 8 constitutes the measuring point on the probe and the extension of said electrode in the axial direction of the probe is a measure of the discrimination. The end face of the rule 4 which is intended to abut against the measuring object, determines another measuring point, which is, thus, associated with the surface of the measuring object, and it is the linear distance between the two measuring points that are being measured.

If the probe is moved right through the measuring object, the resistance of the current paths becomes infinite. The same applies, of course, prior to the introduction of the probe into the measuring object. Thus, from the beginning to the end of the insertion of the probe into a measuring object consisting of layers of fat and flesh, the following, clearly distinguishable states occur:

1. Infinitely high resistance in both current paths 7, 8 and 8, 9;
2. Infinitely high resistance in the current path 8, 9 and fat resistance in the current path 7, 8;
3. Fat resistance in both current paths 7, 8 and 8, 9;
4. Flesh resistance in the current path 7, 8 and fat resistance in the current path 8, 9;
5. Flesh resistance in both current paths;
6. Infinitely high resistance in the current path 7, 8 and flesh resistance in the current path 8, 9.

In the method described, a stepwise insertion of the probe takes place and the attention of the operator has to be constantly paid to the indicator so that he is able to interrupt the insertion at the right moment and perform a reading by means of the above-mentioned slidable rule. He will possibly have to retract the probe slightly so that the measuring point of the probe, the electrode 8, comes to be located correctly.

Figure 3:
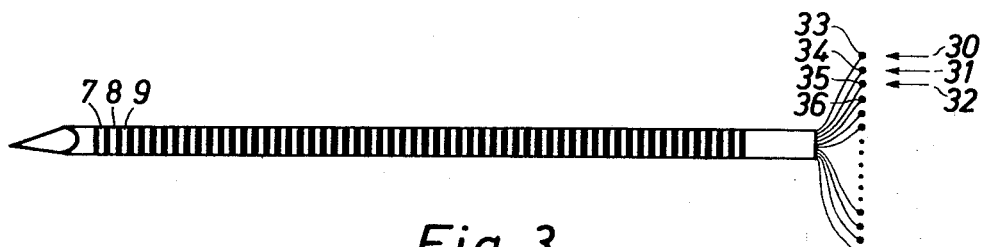
FIG. 3 shows an embodiment of a multi-electrode measuring apparatus according to the invention.

However, it is also possible to utilize a method in which a probe is inserted without performing any readings in the course of the insertion, whereupon the desired measurements are carried out with the stationary probe. This can be done electrically by means of a probe as shown in FIG. 3. This probe has a plurality of electrodes distributed evenly over a length of the probe corresponding at least to the maximum thickness of the measuring object. The electrodes are by means of conductor lines, connected to electrode terminals 33, 34, 35, 36 . . . , etc. associated with a switch (not shown) which has three contract arms indicated schematically with arrows 30, 31 and 32. By successively connecting the contract arms to the electrode terminals and observing the measuring instrument, it is possible to determine the thickness of the layers of fat and flesh on the basis of the known linear spacing between the electrodes. It is thus not necessary to perform any visual reading on a rule, but it is possible to obtain the desired thickness values as multiples of the number of switching stages between positions, where an unbalanced condition of the bridge circuit is detected, and the axial spacing between the electrodes. This axial spacing can be rendered arbitrarily small if the electrodes are not annular but are arranged, for instance, on the surface of the probe along a helical path and have such circumferential dimensions that the generatrices through a given electrode do not intersect the adjoining electrodes.

By means of such probe constructions, the possibility of a fully automatic method is opened up, in which measuring objects, e.g. pigs' carcasses, are conveyed to a measuring station where they are successively gripped and maintained in an anatomically defined position, subsequent to which a number of probes are simultaneously inserted into the measuring object and the electrodes of each probe are successively connected to the bridge circuit and the result is recorded, for instance, on punched cards.

The switching procedure may take place by means of a separate switching and bridge circuit for each probe or by means of a common circuit which is successively connected to each of the probes.

Figure 5:
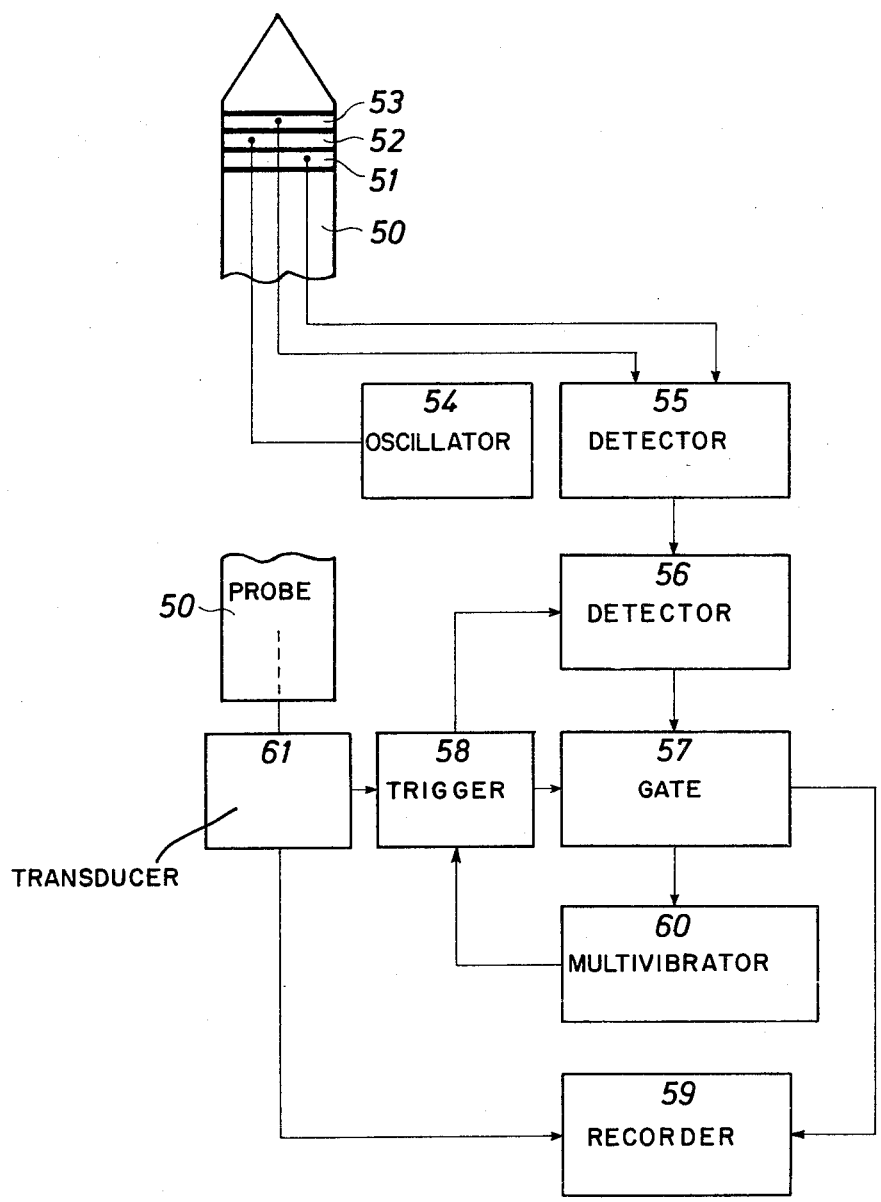
FIG. 5 shows a block diagram to illustrate further details of the apparatus according to the invention.

FIG. 5 shows a block diagram of a measuring apparatus having circuits for electrical calibration and recording. The calibration takes place when the probe is moved into and right through the measuring object, in that the electronic circuits are adapted to distinguish between signals generated by fat-to-flesh and flesh-to-air transitions, respectively. The recording takes place when the probe is retracted, fat and flesh + fat, respectively being marked, possibly via a digital voltmeter.

The marking may take place on a paper strip by means of a graphic recorder or a punching device.

In FIG. 5, the probe, of which only two longitudinal sections are shown, is designated by 50. 51, 52 and 53 are three annular electrodes. The two current paths to be incorporated in a bridge circuit (not shown), are situated between the center electrode 52 and the two electrodes 51 and 53. The center electrode 52 is connected to the output of an oscillator 54 forming part of the bridge circuit. The two electrodes 51 and 53 are connected to a unit 55 comprising two detectors, the output difference voltage of which is supplied to a unit 56 comprising two peak detectors, one for positive and one for negative signal pulses, each of said detectors being connected, possibly through attenuating stages, to a comparator stage, the output voltages of which stages are, together, led to a gate circuit 57 which is controlled by a trigger 58 which also controls the peak detectors in the unit 56. The comparator stages supply an output signal when the output signal from the unit 55 is numerically higher than the input signals to the comparator stages. The output of the gate circuit 57 is connected to a recording stage 59 with a view to reading. The output of the gate circuit 57 is, in addition, connected to a stage 60 comprising a trigger, a multivibrator, a trigger and a multivibrator, the output of which is connected to the trigger 58. The multivibrators are of the one-shot type. The output pulses from stage 60 serve to reset the detectors in the unit 55 and the trigger 58 which may, for example, be a Schmitt-trigger.

A transducer 61 is connected to the probe 50 which generates an electrical signal which is a linear function of the depth of penetration of the probe. The transducer may, for instance, be a potentiometer, the movable contact of which is rigidly connected to a spring-actuated member corresponding to the movable rule 4 shown in FIG. 1. The output from the transducer 61 is connected, on the one hand, to the trigger 58 and, on the other, to the recording stage 59.

The device described enables an automatic, purely electrical recording of the measuring results without the operator having to do anything more than to insert the probe into and move it right through the measuring object and, thereupon, to retract it again. In the course of the insertion, the circuits are set into an initial condition and the measuring results are stored. During the retraction, the measuring results are recorded subsequent to comparison with the results already stored. In the comparison, a maximum deviation of ± 10 percent relative to the stored results is allowed as a condition for recording.

By using a probe with a plurality of electrodes, like the one shown in FIG. 3, a similar electrical circuit can be used supplemented with a switching circuit, the function of which is to connect successively the electrodes of the stationary probe to the ridge circuit, first in one direction and then in the opposite one, three adjacent electrodes being connected to the bridge circuit in each switching stage.

What we claim is:

1. A method for measuring the thickness of layers of fat and flesh in carcasses, comprising the steps of
   connecting at least three longitudinally spaced, insulated surface electrodes of a measuring probe to different junctions of an AC bridge circuit comprising a source of an AC measuring current and indicator means,
   adjusting said bridge circuit to a balanced condition,
   introducing said measuring probe in the carcass to be measured from the outer surface of said fat layer in order to incorporate by means of said three electrodes adjacent current paths extending transversely relative to said layers into two different branches of said bridge circuit,
   observing the condition of said bridge circuit by said indicator means during continued movement of said probe into said carcass, and
   measuring the penetration depth of one point of said probe at the moment when said bridge circuit enters from a balanced to an unbalanced condition.

2. A method as claimed in claim 1, wherein an AC measuring current of a relatively high frequency is supplied to said bridge circuit from said current source.

3. A method as claimed in claim 2, wherein a frequency of the order of magnitude of 40 kc/s is used.

4. A method as claimed in claim 1, further comprising the steps of
moving said probe further into said carcass subsequent to the measuring of said penetration depth, while observing the condition of said bridge circuit,
measuring the penetration depth of said one point of the probe at the moment when said bridge circuit enters again from a balanced into an unbalanced condition,
retracting said probe from the latter penetration depth, while still observing the condition of said bridge circuit, and
measuring the penetration depth of said one point of the probe when during said retraction said bridge circuit enters again from a balanced to an unbalanced condition.

5. A method for measuring the thickness of layers of fat and flesh in carcasses, comprising the steps of
introducing at least one measuring probe provided with a plurality of longitudinally spaced, insulated surface electrodes into the carcass to be measured from one outer surface thereof, until extreme electrodes on said probe are located at or beyond opposite outer surface of said carcass,
connecting by a stepwise electrical switching procedure said surface electrodes in successive groups of three adjacent electrodes to different junctions of a balanced AC bridge circuit comprising a source of an AC measuring current and indicator means in order to incorporate by means of each of said groups adjacent current paths extending transversely relative to said layers into two different branches of said bridge circuit,
observing by said indicator means the condition of said bridge circuit during said switching procedure, and
recording the steps of said switching procedure, at which said bridge circuit enters from a balanced into an unbalanced condition.

6. A method as claimed in claim 5, wherein an AC measuring current of a relatively high frequency is supplied to said bridge circuit from said current source.

7. A method as claimed in claim 6, wherein a frequency of the order of magnitude of 40 kc/s is used.

8. A method as claimed in claim 5, further comprising the steps of
supporting the carcass to be measured at a measuring station in a preselected, anatomically defined position,
introducing a number of measuring probes into said carcass at a corresponding number of measuring points on said outer surface,
carrying out said switching procedure through the surface electrodes of each probe, and
recording for each probe the steps of said switching procedure, at which said bridge circuit enters from a balanced to an unbalanced condition.

9. A method as claimed in claim 8, wherein said probes are successively connected to a common AC bridge circuit and said switching procedures are carried out successively through the surface electrodes of all probes.

10. A method as claimed in claim 8, further comprising the steps of
conveying a plurality of carcasses successively to said measuring station, and
carrying out said switching procedures automatically.

11. An apparatus for measuring the thickness of layers of fat and flesh in carcasses, comprising an AC bridge circuit with a source of an AC measuring current, means connected to said bridge circuit for indicating balanced and unbalanced condition thereof, an elongated measuring probe with at least three insulated measuring electrodes arranged on the surface of a tubular part of said probe with a longitudinal spacing corresponding to the desired measuring accuracy, said electrodes being adapted for contacting said layers in contact points defining adjacent current paths extending transversely relative to said layers, conductor means extending inside said probe for connecting said electrodes to different junctions of said bridge circuit in order to incorporate said adjacent current paths into two different branches thereof and means for measuring the linear distance between a measuring point associated with the surface of the carcass and a measuring point on the probe, respectively.

12. An apparatus as claimed in claim 11, wherein said measuring electrodes are annular.

13. An apparatus as claimed in claim 11, wherein said probe comprises a central core with a sharp-edged spear member in one end thereof and a tubular envelope arranged coaxially with said core, said conductor means extending in the spacing between said core and said envelope from said electrodes to the end of the probe remote from said spear member.

14. An apparatus as claimed in claim 13, wherein amplifier means are connected between said bridge circuit and said indicator means.

15. An apparatus as claimed in claim 14, comprising a handle secured to said remote end of said probe and incorporating said indicator means, a separate casing incorporating said AC bridge circuit and said amplifier means and a flexible cable extending between said handle and said separate casing and incorporating conductor wires for connecting said conductor means inside said probe to said different junctions of the bridge circuit and for connecting the output of said amplifier means to said indicator means.

16. An apparatus as claimed in claim 15, wherein said indicator means consist of three electrical control lamps of different colors, a first one of said lamps serving to indicate that both of said current paths extend in said fat layer, a second lamp serving to indicate that both current paths extend in said flesh layer and the third lamp serving to indicate that one current path extends in the fat layer, the other in the flesh layer, i.e. that said current paths extend on each side of the interface between said layers.

17. An apparatus as claimed in claim 15, wherein said indicator means consist of a pointer instrument having a measuring scale provided with marks for fat and flesh, respectively.

18. An apparatus as claimed in claim 15, wherein said distance measuring means comprises a measuring scale slidable relative to the tubular part of said probe into and out of said handle and a fixed mark associated with said handle, said scale being calibrated so as to indicate in a position, in which the free end thereof abuts against the surface of a carcass, the penetration depth of said measuring point on the probe relative to said measuring point associated with the surface of the carcass.

19. An apparatus as claimed in claim 15, wherein means for automatically recording the output signal from said amplifier means are connected with said casing, said distance measuring means comprising a transducer element arranged on said probe and adapted for generating an electrical signal for controlling said recording means in dependance on the penetration depth of said measuring point on the probe relative to said measuring point associated with the surface of said carcass.

20. An apparatus as claimed in claim 11, wherein the distances between each pair of adjacent electrodes on said probe are equal to each other.

21. An apparatus for measuring the thickness of layers of fat and flesh in carcasses comprising an AC bridge circuit with a source of an AC measuring current, means connected to said bridge circuit for indicating balanced and unbalanced condition thereof, an elongated measuring probe with a plurality of insulated measuring electrodes arranged on the surface of a tubular part thereof through a length corresponding to the maximum total thickness of a carcass to be measured, said electrodes being adapted for contacting said layers in contact points defining adjacent current paths extending transversely relative to said layers, conductor means extending inside said probe for connecting each of said electrodes to an electrode terminal, and a switching device arranged between said electrode terminals and said bridge circuit for connecting successively groups of electrode terminals associated with three adjacent electrodes to different junctions of said bridge circuit in order to incorporate the adjacent current paths defined by said three electrodes into two different branches of the bridge circuit.

22. An apparatus as claimed in claim 21, wherein said measuring electrodes are arranged with uniform axial spacings along a helical path on the surface of said tubular part of the probe, the circumferential dimension of said electrodes being such that generatrices of said tubular part intersecting one electrode does not intersect the electrodes adjacent thereto.

23. An apparatus as claimed in claim 21, wherein amplifier means are connected between said bridge circuit and said indicator means.

24. An apparatus as claimed in claim 23, wherein said indicator means comprise means for automatically recording the output signal from said amplifier means and means for controlling said recording means in dependance on the switching procedure carried out by said switching device.

* * * * *